US009779688B2

(12) United States Patent
Atkins

(10) Patent No.: US 9,779,688 B2
(45) Date of Patent: Oct. 3, 2017

(54) ANCHORING VIEWER ADAPTATION DURING COLOR VIEWING TASKS

(75) Inventor: Robin Atkins, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 573 days.

(21) Appl. No.: 13/595,820

(22) Filed: Aug. 27, 2012

(65) Prior Publication Data

US 2013/0050242 A1 Feb. 28, 2013

Related U.S. Application Data

(60) Provisional application No. 61/528,402, filed on Aug. 29, 2011.

(51) Int. Cl.
*G09G 5/02* (2006.01)
*H04N 1/60* (2006.01)

(52) U.S. Cl.
CPC ............. *G09G 5/02* (2013.01); *H04N 1/6088* (2013.01); *G09G 2320/0606* (2013.01)

(58) Field of Classification Search
None
See application file for complete search history.

(56) References Cited

U.S. PATENT DOCUMENTS

| | | | |
|---|---|---|---|
| 4,760,447 A * | 7/1988 | Koka | H04N 17/04 348/184 |
| 5,212,546 A | 5/1993 | Arazi | |
| 5,276,779 A | 1/1994 | Statt | |
| 5,638,117 A * | 6/1997 | Engeldrum | H04N 17/02 345/904 |
| 6,686,953 B1 | 2/2004 | Holmes | |
| 6,714,211 B2 | 3/2004 | Yoshida | |
| 7,006,130 B2 | 2/2006 | Harshbarger | |
| 7,825,980 B2 | 11/2010 | Takizawa | |
| 2007/0055143 A1 | 3/2007 | Deroo | |
| 2007/0262985 A1* | 11/2007 | Watanabe et al. | 345/420 |
| 2007/0285516 A1* | 12/2007 | Brill et al. | 348/189 |
| 2008/0019611 A1* | 1/2008 | Larkin et al. | 382/287 |
| 2009/0066857 A1* | 3/2009 | Camp, Jr. | 348/744 |
| 2009/0225065 A1* | 9/2009 | Overes | H05B 37/0218 345/207 |
| 2010/0177247 A1* | 7/2010 | Sekulovski et al. | 348/602 |
| 2011/0148903 A1* | 6/2011 | Poree | G06T 7/0083 345/589 |

(Continued)

OTHER PUBLICATIONS

"Gabor Patches". Sensation & Perception. http://sites.sinauer.com/wolfe3e/chap3/gaborF.htm. 2008.*

(Continued)

*Primary Examiner* — Aaron M Richer

(57) ABSTRACT

Techniques for editing visual content by anchoring visual adaptation are disclosed. At least one anchor pattern is presented on a display surround. The perceptibility of the at least one anchor pattern is dependent on visual adaptation. The visual content is edited during the presentation of the at least one anchor pattern. For specific embodiments, the presentation, whether continuous or periodic, can include illumination, emission, reflection, rear projection, forward projection, or the like. A plurality of the patterns can be disposed around a reference display.

34 Claims, 3 Drawing Sheets

(56) References Cited

U.S. PATENT DOCUMENTS

2012/0147163 A1* 6/2012 Kaminsky ..................... 348/62

OTHER PUBLICATIONS

Wolfe, Jeremy M. Sensation & Perception, $2^{nd}$ edition. 2008. p. 51.*
Chan, Glenn. "Color Correction Basics—User Calibration". Retrieved from [http://www.glennchan.info/video/FCP/basic_CC1.htm] on Jan. 17, 2011.
Ecinema, Inc. "How to Create a Professional Final Cut Studio Color Grading Suite". Retrieved from [http://www.ecinemasystems.com/support/learning/white_papers.php].

* cited by examiner

ANCHORING VIEWER ADAPTATION DURING COLOR VIEWING TASKS

CROSS-REFERENCE TO RELATED APPLICATIONS

This application claims priority to U.S. Provisional Application No. 61/528,402 filed 29 Aug. 2011, which is hereby incorporated by reference in entirety for all purposes.

TECHNICAL FIELD

The present invention generally relates to techniques for editing image content to provide desired appearance and consistent characteristics. More specifically, the present invention relates to methods and apparatuses for editing image content after anchoring visual adaptation.

BACKGROUND

Content creators, such as colorists and cinematographers, perform color grading to alter colors and tones of an image to achieve a desired artistic appearance. However, perception is influenced by a viewer's state of visual adaptation, an adjustment to visual sensory sensitivity.

Inconsistent visual adaptation can lead to undesirable, subjective outcomes during color viewing tasks. For example, when several content creators work independently to produce content, the aggregated content may not appear seamless. Correcting the aggregated content for disparate adaption increases delay and expense in production. As another example, when a content creator adjusts colors for a frame portion, those colors are adapted to a local region and can look unfitting in view of the entire frame.

Inconsistent visual adaptation can lead to undesirable, objective outcomes as well. High visual adaption produces content with high brightness (e.g., a higher average picture level) that unnecessarily increases power consumption. Adaptation levels further can lead to content mistakenly produced at a higher light level, rather than with increased dynamic range.

One standard, the Society of Motion Picture and Television Engineers Recommended Practice 166 (SMPTE RP 166), attempts to mitigate inconsistent visual adaptation. SMPTE RP 166 specifies a standard viewing environment, such as color and intensity of light of the ambient environment, for critical color tasks. This standard works reasonably well for legacy reference displays. These displays weakly impact a viewer's adaptation due to relatively small color gamut and luminance. However, for advanced displays with extended luminance, expanded color gamut, and larger size, SMPTE RP 166 alone is inadequate.

Hence, there is a need for techniques for editing visual content by anchoring visual adaptation during color viewing tasks.

SUMMARY OF THE INVENTION

The present invention provides methods and apparatuses for editing visual content by anchoring visual adaptation. A first characteristic for a display surround, generally an area disposed about a reference display, is determined. At least one anchor pattern having a second characteristic is presented on the display surround. The second characteristic is perceptibly different from the first characteristic. During the presentation, the visual content is edited. In this way, a dissimilarity between the at least one anchor pattern and the display surround provide a known adapting stimulus while editing.

As an embodiment of the present invention, the first and second characteristics can be luminance levels. These luminance levels differ by a perceptible amount. The perceptible amount can range between one just noticeable difference (jnd) and four jnd, or more. Alternatively, the first and second characteristics can be any visual adapting stimulus.

As another embodiment of the present invention, a system for editing digital visual content anchors visual adaptation. A sensor measures a first characteristic for a display surround. One or more projectors present at least one pattern having a second characteristic on the display surround. The at least one pattern is perceptible during all or a portion of the editing. The first and second characteristics, such as luminance levels, can be static or dynamic.

As yet another embodiment of the present inventions, a method for editing visual content includes determining a first characteristic for a display surround. At least one pattern having a second characteristic is presented for a time period on the display surround. The at least one pattern is perceptible for a first range of visual adaption and imperceptible for a second range of visual adaption. The visual content is edited during the presenting. Visual content can also be edited outside of time period for presenting, particularly if the presenting is periodic, pseudo-random, or the like.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are well understood to those in the art are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
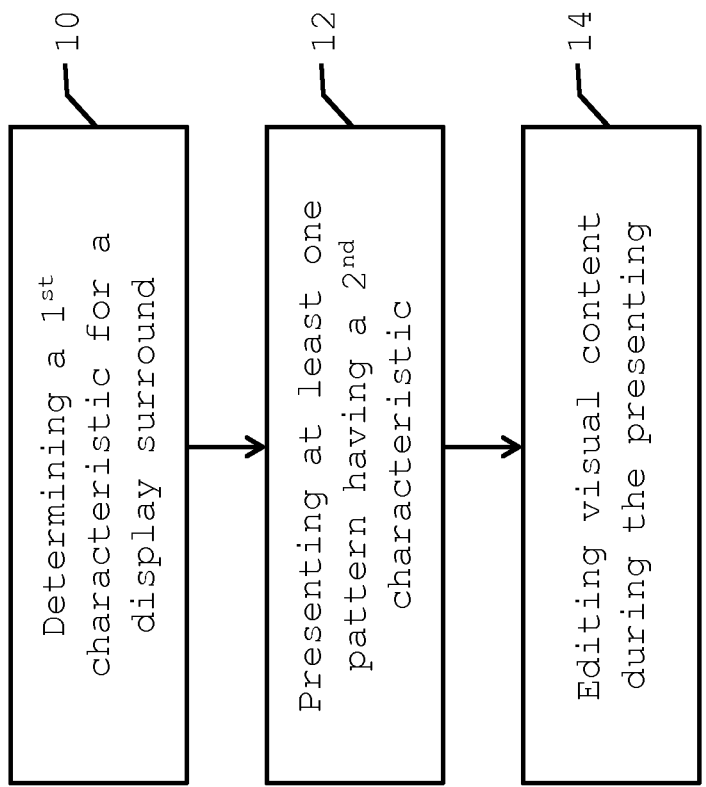
FIG. 1 illustrates a simplified process flow, according to an exemplary embodiment of the present invention.

FIG. 1 is an exemplary process flow, illustrating a method for editing visual content by anchoring visual adaptation of a viewer. In this method, a first characteristic (e.g., a first luminance level) for a display surround is determined as shown in step 10. The determination can be made by measurement using a photometric or radiometric sensor (e.g., a light meter, selenium meter, photometer, photodetector, spectroradiometer, CMOS or CCD imaging sensor, colorimeter, or the like). Alternatively, the determination can be implicit by creating a planned environment: (i) adjusting room's ambient lights; (ii) positioning curtains; (iii) if applicable, adjusting a reference monitor's display surround lights; or (iv) combinations of any of the foregoing. In another instance, the first characteristic can be specified by a viewer as an input parameter. In a specific embodiment, the first characteristic can be a luminance level, which is preferably between about 5% and about 10% of the luminance of a diffuse white object on a reference display.

Next, as indicated at step 12, at least one anchor pattern having a second characteristic is presented on the display surround. The second characteristic is perceptibly different from the first characteristic. For example, the difference can range from one just noticeable difference (jnd) to four jnds, or more. It should be appreciated that the second characteristic can be less (e.g., normal type) or greater (e.g., reversed type) than the first characteristic.

The first or second characteristics can be each static or dynamic. In fact, the first and second characteristics can be varied, either independently or cooperatively, to maintain a maximum, minimum, mean, median, or fixed perceptible difference over a time period (e.g., 1 second, 5 seconds, 1 minute, 10 minutes, or longer).

With dynamic control, a characteristic can be varied discretely, continuously, or intermittently. Discreet step values can be taken in ascending, descending, or pseudo-random order, or be spaced apart uniformly or non-uniformly. For example, the first and second characteristics can be repeatedly adjusted to have a difference of 3 jnd, −1 jnd, 5 jnd, −2 jnd, and 1 jnd. The dwell times at each particular discreet step can be a constant or pseudo-random interval. In an instance where a characteristic varies as a continuous function, it can be linear, piecewise continuous, non-linear, exponential, or the like. Additionally, presentation of anchor patterns relating to luminance, spatial frequency, and contrast can account for contrast sensitivity, a function of visual system's capability to discriminate between luminance levels.

Referring back to step 12, the presentation of the at least one anchor pattern can be accomplished by projection, reflection (specular or diffuse), emission, or combinations thereof. For example, a pattern projector can produce one or more anchor patterns on the display surround. The projector can be a film projector, video projector, slide projector, overhead projector, liquid crystal display projector, laser video projector, whether by rear or forward projection. For reflection, the at least one pattern can comprise reflective materials, such as metal, metalized sheet, foil, reflective ink, silver or fluorescent transfer film, mirror film, dynamic reflective pattern (e.g., e-ink), or the like. In some embodiments of the invention, an anchor pattern can be a printed reflective material attached to the bezel of the display or attached or suspended in front of the display surround (e.g., stickers on curtains). Illumination for reflection can be provided by ambient light or by a specific light source, such as a lamp (e.g., fluorescent, incandescent, filament, arc, LED, or metal-halide lamp). For emission, an anchor pattern can be produced by light emitting diode (LED), organic light emitting diode (OLED), quantum dot (e.g., synthesized colloidal semiconductor nanocrystals), or any aforementioned light source. The pattern could be an emissive element built into a display's bezel.

As an embodiment of the invention, an anchor pattern can be an overlay, similar to a watermark, projected onto a screen or inserted by the display (or software tool driving the display). The intensity of the anchor pattern can be adjusted dependent on the intensity of a local region of the display. In another embodiment of the invention, an anchor pattern can be presented in a menu area, border or sub-region of the display (e.g., a black border for widescreen).

The at least one anchor pattern can be selected from a group including (without limitation) Gabor patterns, Gaussian blobs, zigzags, polka dots, spot images, text, logos, trademarks, fractal images, checker board, repeating grating bars (e.g., square or sine wave grating, or contrast sensitivity function patterns), or geometric shapes (in two or three dimensions for any of the foregoing exemplary anchor patterns). The number of anchor patterns within the display surround can include 1, 2, 3, 4, 5, 10 or more patterns. This number can be static or vary over time during presentation. Similarly, a density of the anchor patterns can vary in time or by position. In other words, such density need not be uniform.

As an exemplary embodiment of the present invention, the at least one pattern includes patterns disposed on four sides of a rectangular screen of a reference display. The presentation of the patterns by forward projection is continuous. The luminance level of the patterns remains static during the presentation.

In step 14, the visual content is edited by a viewer. Editing can encompass mastering and color grading. During the editing process, the viewer can, from time to time, perceive the anchor pattern. In doing so, the viewer's visual adaption is guided to its desired level. In a specific embodiment, the viewer can be periodically prompted by an anchor pattern to answer or take action to verify viewer's perception of the anchor pattern. For example, the viewer studies the display surround until he can distinguish the correct anchor pattern. In a specific embodiment, presentation of an anchor pattern can be toggled on or off by the viewer after perception.

Figure 2:
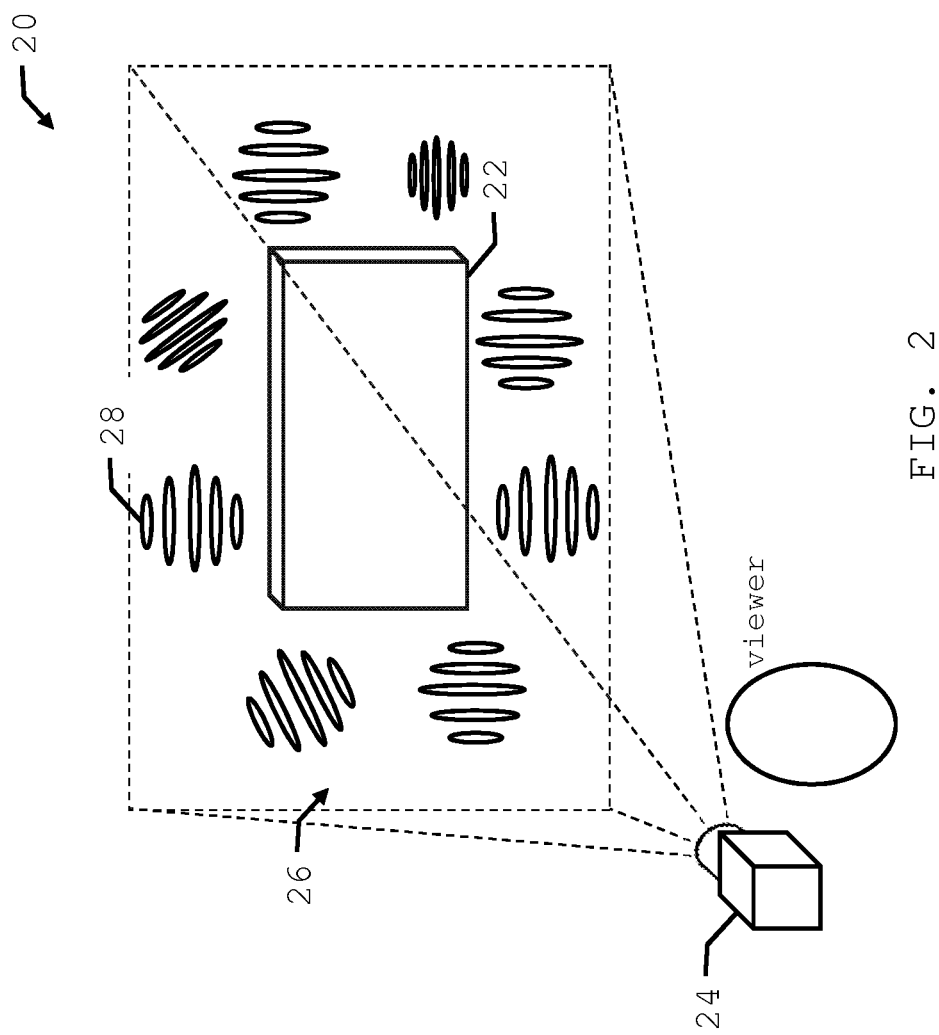
FIG. 2 is a simplified, diagrammatic representation of a visual anchoring system, according to an exemplary embodiment of the present invention.

FIG. 2 is a simplified, diagrammatic representation of a visual anchoring system 20 according to an embodiment of the present invention. Visual anchoring system 20 includes: a reference display 22, pattern projector 24, display surround 26, and at least one anchor pattern 28.

Reference display 22 can be a studio monitor used by cinematographers, colorist, and other content creators, such as the Dolby® PRM-4200 Professional Reference Monitor. Alternatively, reference display 22 can be a cathode ray tube display conventionally used for professional color grading or mastering. In other embodiments, reference display 22 can be replaced with a projection screen (e.g., silver screen, matte screen, or grey screen) showing content from a cinema projector (not shown) or pattern projector 24, when configured to present content.

In the depicted embodiment, pattern projector 24 projects anchor patterns around a perimeter of display 22. These anchor patterns can vary in size, location, 3D depth, duration, color, orientation, brightness, or combinations thereof. Further, these anchor patterns can have varied motion, either movement within the display surround or rotation in place. Pattern projector 24 can be, in some embodiments, a scanning beam projector. The scanning beam projector emits a scannable beam of white light or, as an alternative, emits one or more laser beams of primary colors (e.g., red, green, or blue beams). The beams are emitted together or independently to cause the at least one anchor pattern 28 to have the desired brightness and/or colors.

For system 20, a predetermined absolute luminance of display surround 26 can adjusted to a predetermined level, for example, 12 cd/m$^2$, to create desired viewing environment. The color and the luminance of the at least one pattern 28 can be adjusted, as an example, until reflected light from pattern projector 22 measures 12 cd/m$^2$, D65 correlated color temperature (CCT), and spectral power measures D65. Illuminant D65 is a standardized illuminant defined by the International Commission on Illumination. The luminance level of a large patch of at least one pattern 28 can be adjusted until the luminance level of the reflected light measures 13 cd/m$^2$. Thus, peak intensity of the at least one pattern 28 perceptibly differs from display surround 26.

It should be appreciated that reference display 20, in certain embodiments, can present stereoscopic or autostereoscopic images for content grading or mastering. In such embodiments, display surround 26 can become a volumetric space disposed about a 3D field of view. Pattern projector 24 can optionally produce one or more three dimensional (3D) anchor patterns. Pattern projector 24 need not produce its 3D effect, whether through polarization or spectrally sensitive glasses (e.g., notch filters for each eye perspective), in the same manner as reference display 20.

Figure 3:
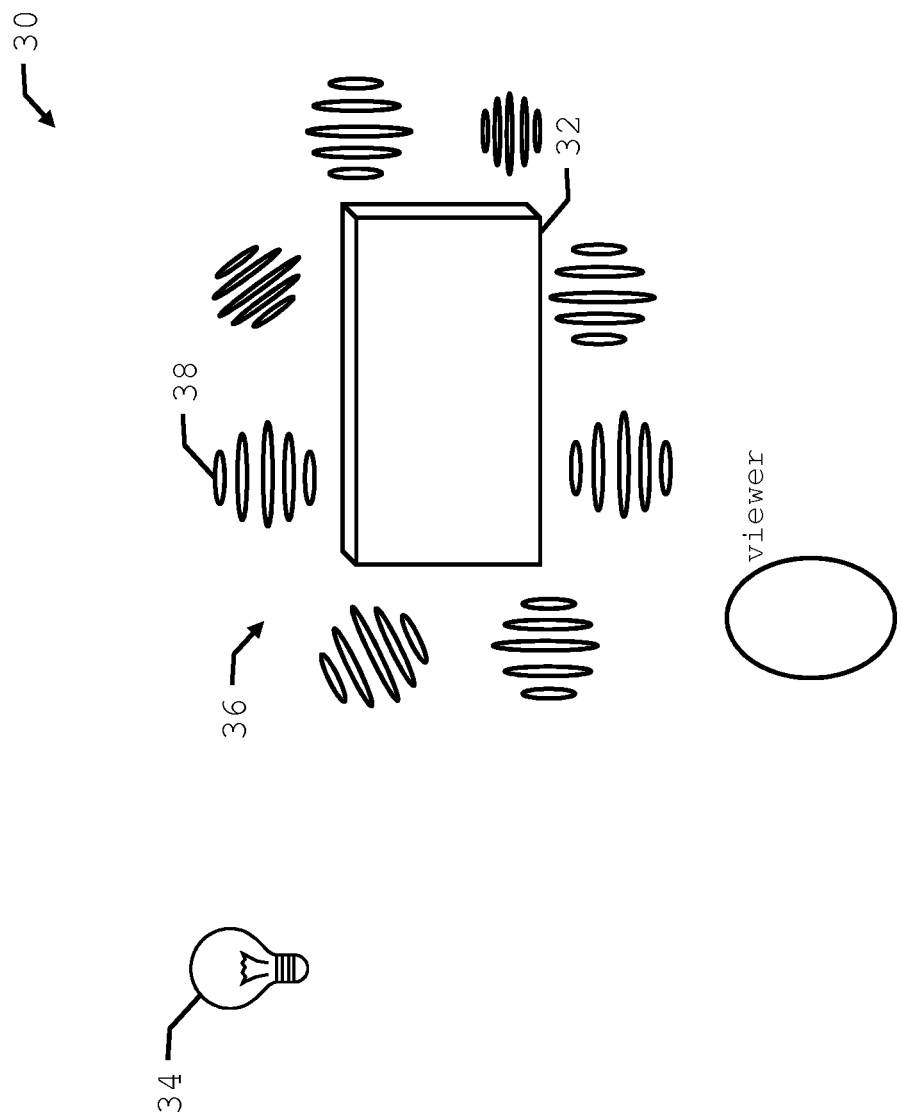
FIG. 3 is a simplified, diagrammatic representation of a visual anchoring system, according to another exemplary embodiment of the present invention.

FIG. 3 is a simplified, diagrammatic representation of a visual anchoring system 30 according to an exemplary embodiment of the present invention. System 30 includes at least one light 34 to illuminate a display surround area 36. The at least one light 34 establishes, in part, a luminance level and/or color tone of display surround 36. In a specific embodiment, a plurality of lights can be disposed about the periphery of reference display 30. Alternatively, the at least one light 34 can be integrated into a backside form factor of reference display 30.

The at least one light 34 can comprise one of an OLED, LED, or quantum dot selected for luminance, uniformity, or product life. In a specific embodiment, light 34 is adjustable (manually or electronically) by the viewer. As another embodiment, light 34 can be adjusted automatically based a measurement of an optional sensor (not shown). This sensor can be integrated within reference display 30 or, alternatively, it can be a standalone device.

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific from in which such claims issue, including any subsequent correction. No limitation, element, property, feature, advantage or attribute that is not expressly recited in a claim should limit the scope of such claim in any way. The specification and drawings are, accordingly, to be regarded in an illustrative rather than a restrictive sense. It should be further understood, for clarity, that exempli gratia (e.g.) means "for the sake of example" (not exhaustive), which differs from id est (i.e.) or "that is."

Additionally, in the foregoing description, numerous specific details are set forth such as examples of specific components, devices, methods, in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention.

What is claimed is:

1. A method for editing visual content displayed on a reference display by anchoring visual adaptation, the reference display being situated in a reference display area and having associated therewith a display surround, the display surround being an area outside the reference display area and surrounding the reference display, the method comprising:

determining a first characteristic for the display surround;

presenting, on the display surround, at least one anchor pattern having a second characteristic; and editing the visual content during the presenting by using the visual difference between the first characteristic and the second characteristic;

wherein the presenting is configured for the at least one anchor pattern to be perceptible for a first range of human visual adaption and imperceptible for a second range of human visual adaption, and wherein:

the editing includes at least one of mastering and color grading; and the at least one anchor pattern includes a Gabor pattern.

2. A method for editing visual content displayed on a reference display by anchoring visual adaptation, the reference display being situated in a reference display area and having associated therewith a display surround, the display surround being an area outside the reference display area and surrounding the reference display, the method comprising:

determining a first characteristic for the display surround;

presenting at least one anchor pattern with a second characteristic on the display surround, the second characteristic differing visually from the first characteristic by a perceptible amount; and editing the visual content displayed on the reference display during the presenting by using the visual difference between the first characteristic and the second characteristic;

wherein:

the editing includes at least one of mastering and color grading; and the at least one anchor pattern includes a Gabor pattern.

3. The method of claim 2 wherein the first characteristic is a first luminance level and the second characteristics is a second luminance level.

4. The method of claim 3 wherein the perceptible amount ranges between a first predetermined minimum difference of luminance and a second predetermined minimum difference of luminance.

5. The method of claim 3 wherein the second luminance level is less than the first luminance level.

6. The method of claim 3 wherein the second luminance level is greater than the first luminance level.

7. The method of claim 3 further comprising adjusting ambient light to attain the second luminance level.

8. The method of claim 3 wherein the at least one anchor pattern is emissive.

9. The method of claim 3 wherein the presenting is illumination of the at least one anchor pattern, the at least one anchor pattern comprising a printed reflective material.

10. The method of claim 9 wherein the illumination is provided by the ambient light.

11. The method of claim 3 wherein the presenting is at least one of rear projection and forward projection.

12. The method of claim 3 wherein the determining is a predetermined assessment of the ambient environment.

13. The method of claim 3 wherein the first luminance level is less than 10% of peak luminance of the reference display.

14. The method of claim 2 wherein the at least one anchor pattern includes patterns disposed on four sides of a rectangular screen of the reference display.

15. The method of claim 2 wherein the presenting is continuous.

16. The method of claim 2 wherein the presenting is periodic.

17. The method of claim 2 wherein the presenting is based on a random interval.

18. The method of claim 2 wherein the second characteristic varies during the presenting.

19. The method of claim 18 wherein the at least one anchor pattern comprises patterns that vary in size.

20. A system for editing visual content displayed on a reference display by anchoring visual adaptation, the reference display being situated in a reference display area and having associated therewith a display surround, the display surround being an area outside the reference display area and surrounding the reference display, the system comprising:
 a means for determining a first luminance level for the display surround;
 a means for presenting at least one anchor pattern at a second luminance level on the display surround, the second luminance level differing from the first luminance level by a perceptible amount; and
 a means for editing the visual content during the presenting by using a visual difference between the first luminance level and the second luminance level, wherein:

the editing includes at least one of mastering and color grading; and the at least one anchor pattern includes a Gabor pattern.

21. The system of claim 20 wherein the perceptible amount ranges between a first predetermined minimum difference of luminance and a second predetermined minimum difference of luminance.

22. The system of claim 20 wherein the second luminance level is less than the first luminance level.

23. The system of claim 20 wherein the second luminance level is greater than the first luminance level.

24. The system of claim 20 wherein the second luminance level is attained by adjusting ambient light.

25. The system of claim 20 wherein the at least one anchor pattern is emissive.

26. The system of claim 20 wherein the presenting is at least one of rear projection and forward projection.

27. The system of claim 20 wherein the determining is a predetermined assessment of the ambient environment during the editing.

28. The system of claim 20 wherein the first luminance level is less than about 10% of peak luminance of the reference display.

29. The system of claim 20 wherein the at least one anchor pattern includes patterns disposed on four sides of a rectangular screen of the reference display.

30. The system of claim 20 wherein the presenting is continuous.

31. The system of claim 20 wherein the presenting is periodic.

32. The system of claim 20 wherein the presenting is based on a random interval.

33. The system of claim 20 wherein the second luminance level varies during the presenting.

34. The system of claim 20 wherein the at least one anchor pattern varies in at least one of size, color, location, 3D depth, duration, brightness, or orientation.

* * * * *